(12) United States Patent
Green

(10) Patent No.: US 10,568,445 B1
(45) Date of Patent: Feb. 25, 2020

(54) DISPLAY ASSEMBLY

(71) Applicant: Matthew Green, Attica, OH (US)

(72) Inventor: Matthew Green, Attica, OH (US)

( * ) Notice: Subject to any disclaimer, the term of this patent is extended or adjusted under 35 U.S.C. 154(b) by 0 days.

(21) Appl. No.: 16/122,507

(22) Filed: Sep. 5, 2018

(51) Int. Cl.
*A47G 7/04* (2006.01)
*A01G 5/04* (2006.01)
*E04H 13/00* (2006.01)

(52) U.S. Cl.
CPC ............... *A47G 7/041* (2013.01); *A01G 5/04* (2013.01); *E04H 13/001* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,596,812 A * | 8/1926 | Curtis | ................... | A61G 17/04 |
| | | | | 211/119.002 |
| 2,261,326 A * | 11/1941 | Atkisson | .................. | A01G 5/04 |
| | | | | 248/156 |
| 2,815,606 A * | 12/1957 | Quackenbush | .......... | A01G 5/04 |
| | | | | 47/41.12 |
| 4,640,045 A * | 2/1987 | Nesbitt | ..................... | A01G 9/04 |
| | | | | 47/39 |
| 4,739,582 A | 4/1988 | Culliname | | |
| 5,072,542 A * | 12/1991 | Quackenbush | .......... | A01G 9/02 |
| | | | | 220/23.4 |
| 5,368,266 A * | 11/1994 | Allen | ..................... | A47G 7/044 |
| | | | | 108/47 |
| 5,390,443 A | 2/1995 | Emalfarb | | |
| D359,629 S * | 6/1995 | Korkowski | .................. | D11/164 |
| 5,687,515 A * | 11/1997 | Rodrigues | ............. | E04H 13/003 |
| | | | | 40/124.5 |
| 6,557,806 B2 * | 5/2003 | Davies | ................... | A47G 7/041 |
| | | | | 211/85.23 |
| 6,564,506 B1 | 5/2003 | Leger | | |
| 6,688,040 B1 * | 2/2004 | Yang | ........................ | A01G 5/04 |
| | | | | 47/41.1 |
| 7,305,794 B1 * | 12/2007 | Cantrell | ................... | A01G 5/04 |
| | | | | 248/499 |
| 7,640,694 B1 * | 1/2010 | Cantrell | ................... | A01G 5/04 |
| | | | | 27/1 |
| 8,523,118 B2 | 9/2013 | Weder | | |
| D723,972 S * | 3/2015 | Young | .......................... | D11/156 |
| 9,307,700 B1 * | 4/2016 | Schmitt | .................... | G09F 17/00 |
| 9,445,548 B1 * | 9/2016 | Hicks | ....................... | A01G 5/04 |
| 9,743,593 B1 * | 8/2017 | Lawson | ................. | E04H 13/003 |
| 2008/0276503 A1 * | 11/2008 | Johnson | ................ | E04H 13/003 |
| | | | | 40/124.5 |
| 2011/0010916 A1 * | 1/2011 | Weder | ..................... | A01G 5/04 |
| | | | | 29/428 |

(Continued)

*Primary Examiner* — Monica E Millner

(57) ABSTRACT

A display assembly for a headstone includes a frame. A plurality of arms is coupled to and extends from a bottom of the frame. The arms are configured to position on opposing faces of a headstone. Each of a plurality of couplers is coupled to a respective arm distal from the frame. The coupler is configured to couple the arm to the headstone so that the frame is positioned atop the headstone. A plurality of spikes is coupled to and extends perpendicularly from the bottom of the frame to proximate to a top of the frame. The plurality of spikes is configured to insert into a block. The block is configured to insert items, such as flowers, to couple the items to the frame to decorate the headstone.

13 Claims, 5 Drawing Sheets

(56) References Cited

U.S. PATENT DOCUMENTS

| | | | |
|---|---|---|---|
| 2011/0036001 A1* | 2/2011 | Aker | A47G 7/044 47/41.12 |
| 2011/0067299 A1* | 3/2011 | Tilley | A01G 5/04 47/41.01 |
| 2017/0143147 A1* | 5/2017 | Safriet | A01G 5/04 |

* cited by examiner

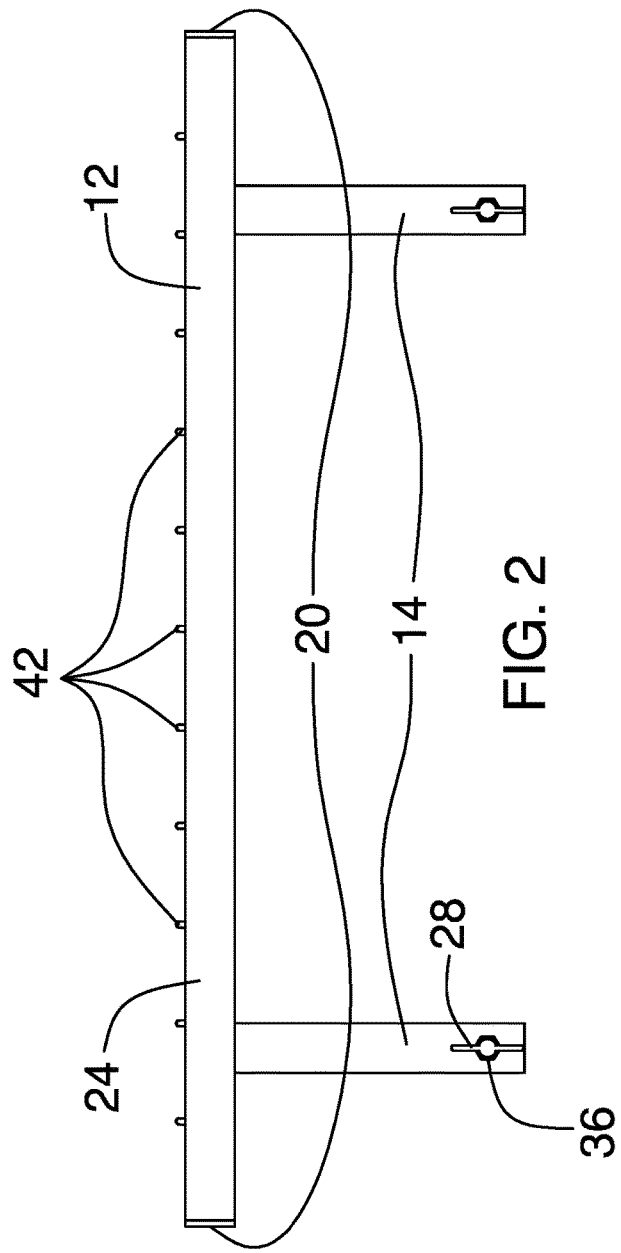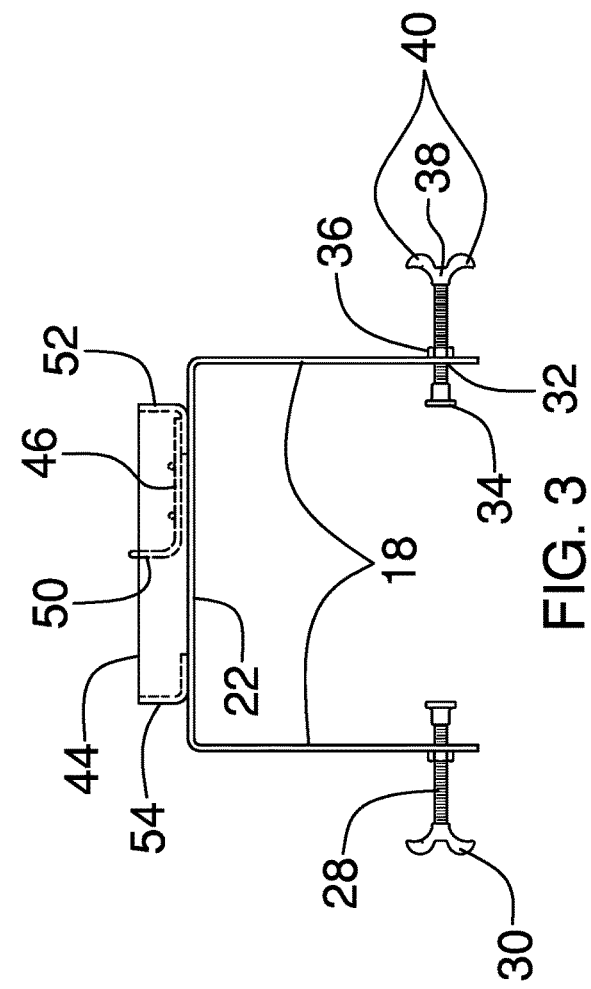

DISPLAY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98.

The disclosure and prior art relates to display assemblies and more particularly pertains to a new display assembly for a headstone.

BRIEF SUMMARY OF THE INVENTION

An embodiment of the disclosure meets the needs presented above by generally comprising a frame. A plurality of arms is coupled to and extends from a bottom of the frame. The arms are configured to position on opposing faces of a headstone. Each of a plurality of couplers is coupled to a respective arm distal from the frame. The coupler is configured to couple the arm to the headstone so that the frame is positioned atop the headstone. A plurality of spikes is coupled to and extends perpendicularly from the bottom of the frame to proximate to a top of the frame. The plurality of spikes is configured to insert into a block. The block is configured to insert items, such as flowers, to couple the items to the frame to decorate the headstone.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a front view of an embodiment of the disclosure.

FIG. 3 is an end view of an embodiment of the disclosure.

DETAILED DESCRIPTION OF THE INVENTION

Figure 1:
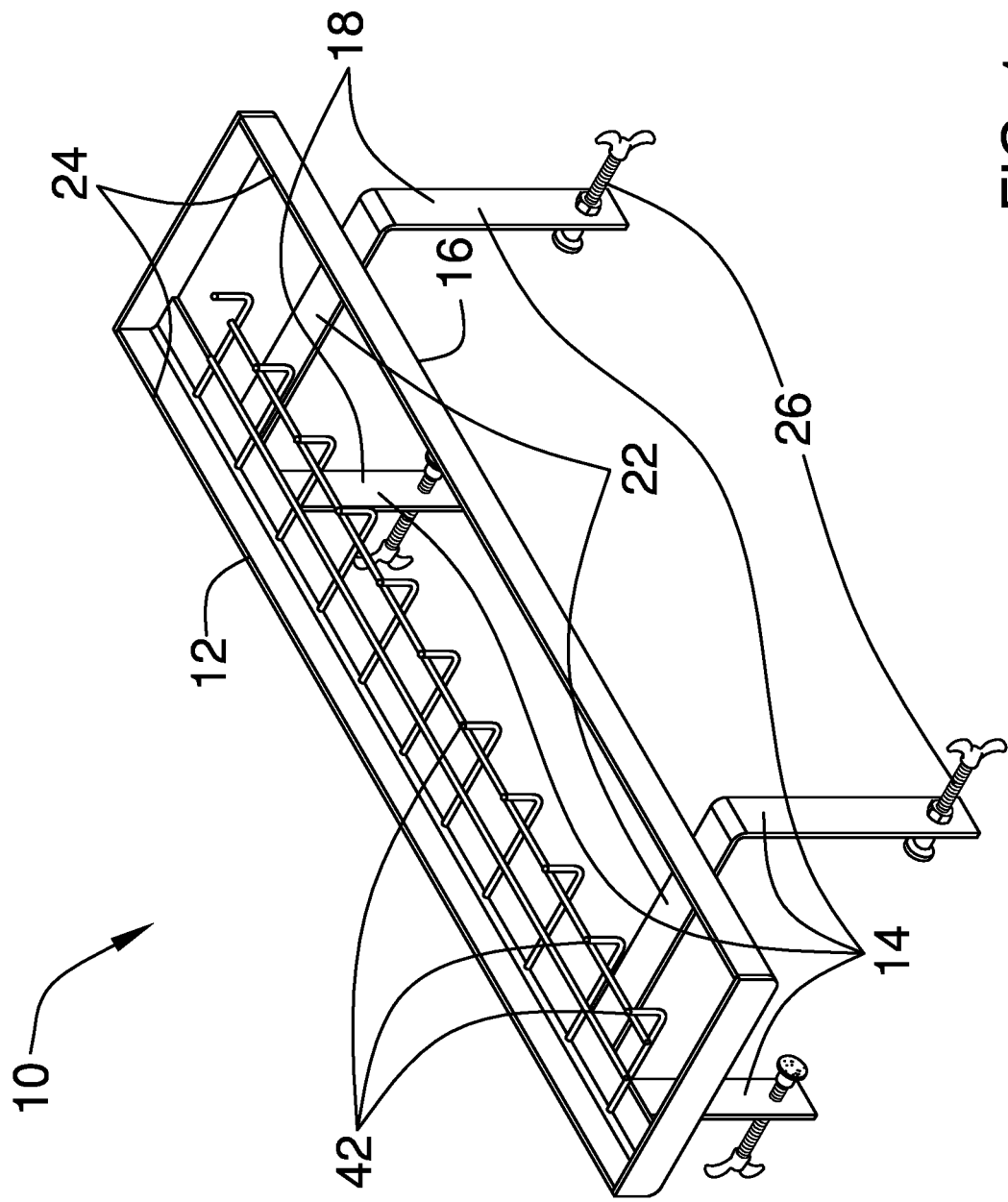
FIG. 1 is an isometric perspective view of a display assembly according to an embodiment of the disclosure.

With reference now to the drawings, and in particular to FIGS. 1 through 6 thereof, a new display assembly embodying the principles and concepts of an embodiment of the disclosure and generally designated by the reference numeral 10 will be described.

Figure 4:
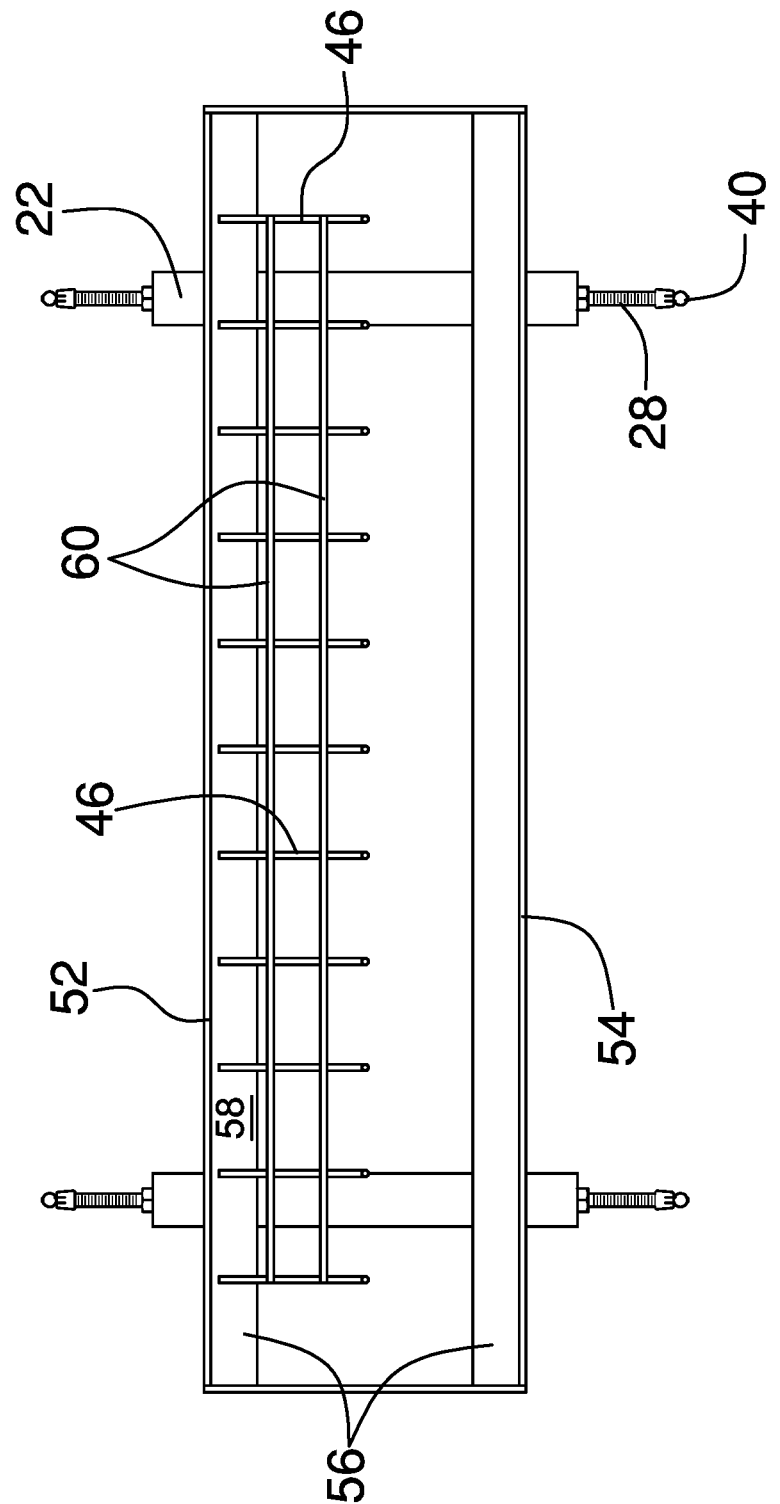
FIG. 4 is a top view of an embodiment of the disclosure.
Figure 5:
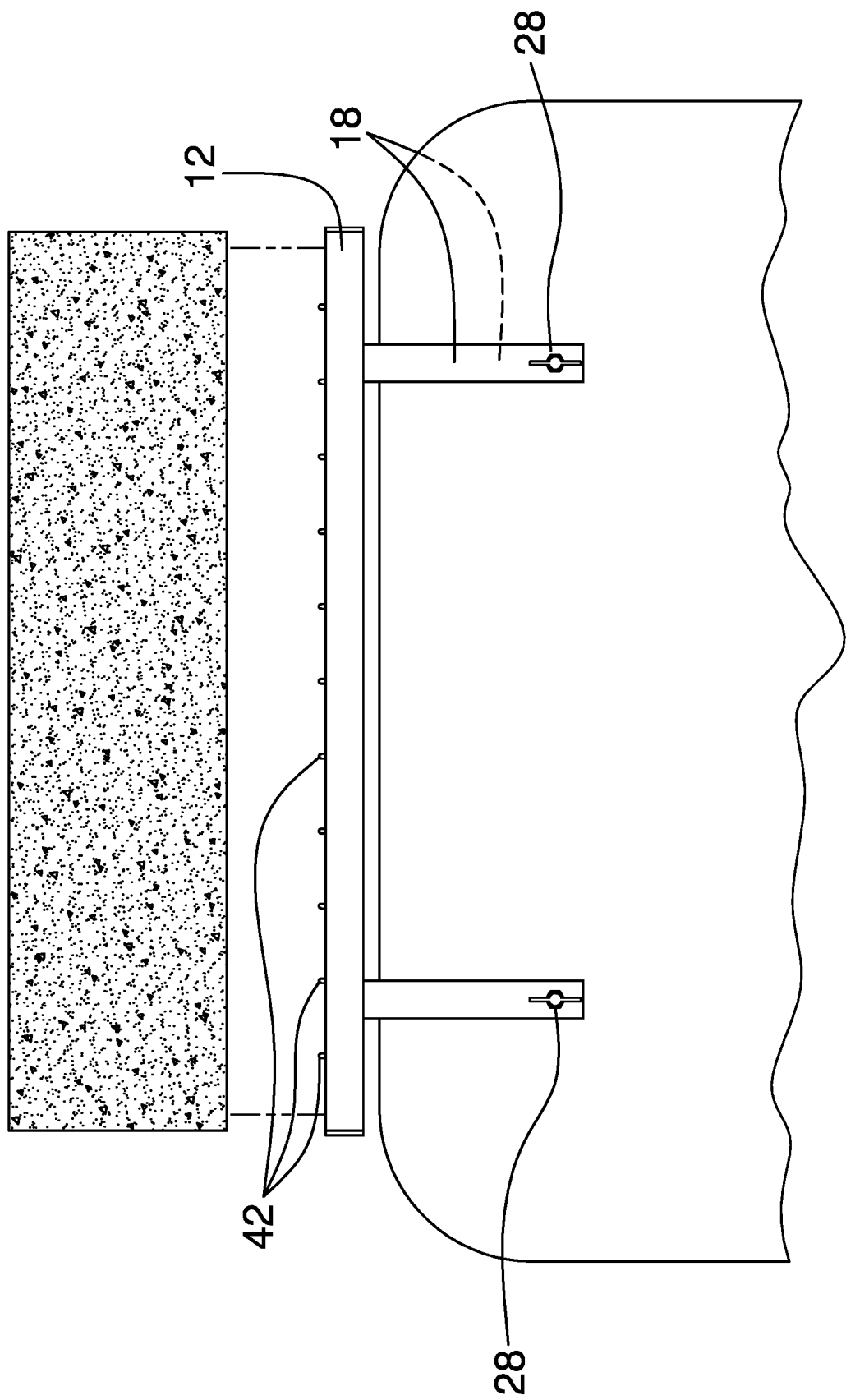
FIG. 5 is an in-use view of an embodiment of the disclosure.

As best illustrated in FIGS. 1 through 6, the display assembly 10 generally comprises a frame 12 that is substantially rectangularly shaped. A plurality of arms 14 is coupled to and extends from a bottom 16 of the frame 12. The arms 14 are configured to position on opposing faces of a headstone, as shown in FIG. 5. The plurality of arms 14 comprises two pairs of arms 18. Each pair of arms 18 is positioned proximate to a respective opposing end 20 of the frame 12, as shown in FIG. 2.

Each of a pair of bars 22 is coupled to and extends between a respective pair of arms 18 so that each of the arms 18 extends perpendicularly from the bar 22, positioning the pair of arms 18 to bracket the headstone. The bars 22 are coupled to the bottom 16 of the frame 12 and extend between opposing sides 24 of the frame 12. Each bar 22 protrudes from each opposing side 24 of the frame 12, as shown in FIG. 3, so that the respective pair of arms 18 is spaced substantially complementarily to the opposing faces of the headstone.

Figure 6:
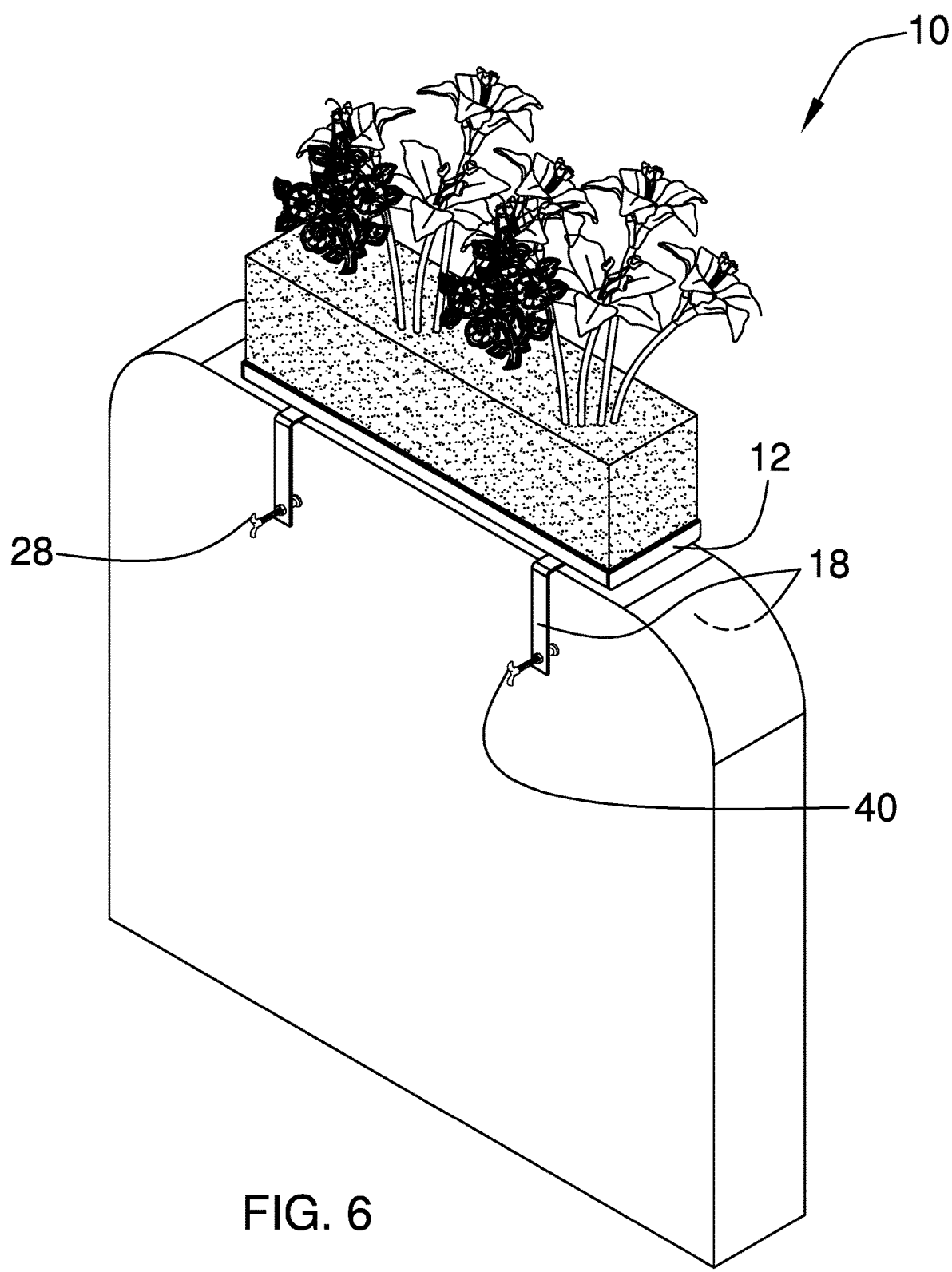
FIG. 6 is an in-use view of an embodiment of the disclosure.

Each of a plurality of couplers 26 is coupled to a respective arm 14 distal from the frame 12. The coupler 26 is configured to couple the arm 14 to the headstone so that the frame 12 is positioned atop the headstone, as shown in FIG. 6.

Each coupler 26 comprises a thumbscrew 28, as shown in FIG. 3. A head 30 of the thumbscrew 28 is positioned to be rotated to turn the thumbscrew 28 within a threaded hole 32 that is positioned through the respective arm 14 so that a foot 34 of the thumbscrew 28 is frictionally coupled to the headstone. The foot 34 comprises rubber or the like so that the foot 34 does not mar a surface of the headstone. A nut 36 is coupled to the respective arm 14 so that the nut 36 is aligned with the threaded hole 32. The nut 36 is positioned to threadedly couple to the thumbscrew 28. The thumbscrews 28 allow the frame 12 to be coupled to headstones having a variety of thicknesses.

The head 30 of the thumbscrew 28 is positioned on a terminus 38 of the thumbscrew 28. The head 30 comprises a pair of hooks 40, as shown in FIG. 3. Each hook 40 extends arcuately from the terminus 38. A respective hook 40 is configured to couple to an article, such as handle on a basket, to couple the article to the frame 12 to decorate the headstone.

A plurality of spikes 42 is coupled to and extends perpendicularly from the bottom 16 of the frame 12 to proximate to a top 44 of the frame 12, as shown in FIG. 1. The plurality of spikes 42 is configured to insert into a block, such as a floral foam block as shown in FIG. 5. The block is configured to insert items, such as flowers, to couple the items to the frame 12 to decorate the headstone, as shown in FIG. 6.

Each spike 42 comprises a first rod 46. The first rod 46 comprises a first section 48 and a second section 50. The first section 48 is coupled to one opposing side 52 of the frame 12 proximate to the bottom 16 and extends perpendicularly toward the other opposing side 54 of the frame 12. The second section 50 is coupled to the first section 48 distal to the one opposing side 52 of the frame 12. The second section 50 extends perpendicularly from the first section 48 toward the top 44 of the frame 12 so that the first rod 46 is L-shaped. The second section 50 is positioned substantially equally distant from the opposing sides 24 of the frame 12.

Each of a pair of plates 56 is coupled to and extends perpendicularly from a respective opposing side 24 of the frame 12 proximate to the bottom 16 and toward the other opposing side 24 of the frame 12, as shown in FIG. 4. The plates 56 are positioned to stabilize the frame 12 in a rectangular configuration. The first section 48 of the first rod 46 is coupled to an upper face 58 of a respective plate 56.

Each of a pair of second rods 60 is coupled to and extends between the first sections 48 of the first rods 46, as shown in FIG. 4. The second rods 60 are opposingly positioned on the first rods 46 relative to the respective plate 56. The second rods 60 are positioned to fixedly position the first rods 46 in a parallel configuration. The pair of second rods 60 is positioned singly proximate to the respective plate 56 and substantially equally distant from the respective plate 56 and the second sections 50 of the first rods 46.

The present invention also anticipates the frame 12 being arcuate when viewed from a respective opposing side 24 of the frame 12 so that the frame 12 is configured to position on a headstone that has a curved upper end.

In use, the frame 12 is positioned atop the headstone with each pair of arms 14 bracketing the headstone. The thumbscrews 28 are tightened to secure the frame 12 to the headstone. The block is pressed onto the spikes 42 and the items are inserted into the block to decorate the headstone.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A display assembly comprising:
   a frame, the frame being substantially rectangularly shaped;
   a plurality of arms coupled to and extending from a bottom of the frame wherein the arms are configured for positioning on opposing faces of a headstone;
   a plurality of couplers, each coupler being coupled to a respective arm distal from the frame wherein the coupler is configured for coupling the arm to the headstone such that the frame is positioned atop the headstone, each coupler comprising a thumbscrew wherein a head of the thumbscrew is positioned for rotating for turning the thumbscrew within a threaded hole positioned through the respective arm such that a foot of the thumbscrew frictionally couples to the headstone, the head of the thumbscrew being positioned on a terminus of the thumbscrew, the head comprising a pair of hooks, each hook extending arcuately from the terminus wherein a respective hook is configured for coupling to an article for coupling the article to the frame for decorating the headstone; and
   a plurality of spikes coupled to and extending perpendicularly from the bottom of the frame to proximate to a top of the frame wherein the plurality of spikes is configured for inserting into a block that is configured for inserting items for coupling the items to the frame for decorating the headstone each spike comprising a first rod, the first rod comprising a first section coupled to one opposing side of the frame proximate to the bottom, the first section extending perpendicularly toward the other opposing side of the frame, the first rod comprising a second section coupled to the first section distal to the one opposing side of the frame, the second section extending perpendicularly from the first section toward the top of the frame such that the first rod is L-shaped.

2. The assembly of claim 1, further including the plurality of arms comprising two pairs of arms, each pair of arms being positioned proximate to a respective opposing end of the frame.

3. The assembly of claim 2, further including a pair of bars, each bar being coupled to and extending between a respective pair of arms such that each of the arms extends perpendicularly from the bar positioning the pair of arms for bracketing the headstone.

4. The assembly of claim 3, further including the bars being coupled to the bottom of the frame and extending between opposing sides of the frame.

5. The assembly of claim 4, further including each bar protruding from each opposing side of the frame such that the respective pair of arms is spaced substantially complementarily to the opposing faces of the headstone.

6. The assembly of claim 1, further including the foot comprising rubber.

7. The assembly of claim 1, further including a nut coupled to the respective arm such that the nut is aligned with the threaded hole wherein the nut is positioned for threadedly coupling to the thumbscrew.

8. The assembly of claim 1, further including the second section being positioned substantially equally distant from the opposing sides of the frame.

9. The assembly of claim 8, further including a pair of plates, each plate being coupled to and extending perpendicularly from a respective opposing side of the frame proximate to the bottom toward the other opposing side of the frame wherein the plates are positioned for stabilizing the frame in a rectangular configuration.

10. The assembly of claim 9, further including the first section of the first rod being coupled to an upper face of a respective plate.

11. The assembly of claim 10, further including a pair of second rods, each second rod being coupled to and extending between the first sections of the first rods such that the second rods are opposingly positioned on the first rods relative to the respective plate wherein the second rods are positioned for fixedly positioning the first rods in a parallel configuration.

12. The assembly of claim 11, further including the pair of second rods being positioned singly proximate to the respective plate and substantially equally distant from the respective plate and the second sections of the first rods.

13. A display assembly comprising:
a frame, the frame being substantially rectangularly shaped;
a plurality of arms coupled to and extending from a bottom of the frame wherein the arms are configured for positioning on opposing faces of a headstone, the plurality of arms comprising two pairs of arms, each pair of arms being positioned proximate to a respective opposing end of the frame;
a pair of bars, each bar being coupled to and extending between a respective pair of arms such that each of the arms extends perpendicularly from the bar positioning the pair of arms for bracketing the headstone, the bars being coupled to the bottom of the frame and extending between opposing sides of the frame, each bar protruding from each opposing side of the frame such that the respective pair of arms is spaced substantially complementarily to the opposing faces of the headstone;
a plurality of couplers, each coupler being coupled to a respective arm distal from the frame wherein the coupler is configured for coupling the arm to the headstone such that the frame is positioned atop the headstone, each coupler comprising a thumbscrew wherein a head of the thumbscrew is positioned for rotating for turning the thumbscrew within a threaded hole positioned through the respective arm such that a foot of the thumbscrew frictionally couples to the headstone, the foot comprising rubber, the head of the thumbscrew being positioned on a terminus of the thumbscrew, the head comprising a pair of hooks, each hook extending arcuately from the terminus wherein a respective hook is configured for coupling to an article for coupling the article to the frame for decorating the headstone;
a nut coupled to the respective arm such that the nut is aligned with the threaded hole wherein the nut is positioned for threadedly coupling to the thumbscrew;
a plurality of spikes coupled to and extending perpendicularly from the bottom of the frame to proximate to a top of the frame wherein the plurality of spikes is configured for inserting into a block that is configured for inserting items for coupling the items to the frame for decorating the headstone, each spike comprising a first rod, the first rod comprising a first section coupled to one opposing side of the frame proximate to the bottom, the first section extending perpendicularly toward the other opposing side of the frame, the first rod comprising a second section coupled to the first section distal to the one opposing side of the frame, the second section extending perpendicularly from the first section toward the top of the frame such that the first rod is L-shaped, the second section being positioned substantially equally distant from the opposing sides of the frame;
a pair of plates, each plate being coupled to and extending perpendicularly from a respective opposing side of the frame proximate to the bottom toward the other opposing side of the frame wherein the plates are positioned for stabilizing the frame in a rectangular configuration, the first section of the first rod being coupled to an upper face of a respective plate; and
a pair of second rods, each second rod being coupled to and extending between the first sections of the first rods such that the second rods are opposingly positioned on the first rods relative to the respective plate wherein the second rods are positioned for fixedly positioning the first rods in a parallel configuration, the pair of second rods being positioned singly proximate to the respective plate and substantially equally distant from the respective plate and the second sections of the first rods.

\* \* \* \* \*